US012248431B1

United States Patent
Sonin et al.

(10) Patent No.: US 12,248,431 B1
(45) Date of Patent: Mar. 11, 2025

(54) HANDLING CASE SENSITIVITY OF FILENAMES

(71) Applicant: VAST DATA LTD., Tel Aviv (IL)

(72) Inventors: Oded Sonin, Tel Aviv (IL); Dror Dayan, Tel Aviv (IL); Avi Goren, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/516,885

(22) Filed: Nov. 21, 2023

(51) Int. Cl.
G06F 16/00 (2019.01)
G06F 16/11 (2019.01)
G06F 16/16 (2019.01)

(52) U.S. Cl.
CPC .......... G06F 16/122 (2019.01); G06F 16/164 (2019.01)

(58) Field of Classification Search
CPC ...... G06F 16/152; G06F 16/116; G06F 16/13; G06F 16/137; G06F 16/166; G06F 16/90335; G06F 16/93; G06F 12/0813; G06F 12/0815; G06F 12/0866; G06F 16/172; G06F 16/182; G06F 16/183; G06F 21/6218; G06F 2212/264; G06F 2212/463; G06F 2221/2141; G06Q 20/14; G06Q 20/10; G06Q 30/04; G06Q 30/06; G06Q 40/00; G05B 19/0426; A47J 27/04; A47J 27/08; A47J 27/09; A47J 44/00; G07C 13/00; G16H 10/60; G16Z 99/00
See application file for complete search history.

(56) References Cited

U.S. PATENT DOCUMENTS

| | | | | |
|---|---|---|---|---|
| 2007/0208803 | A1* | 9/2007 | Levi | H04L 51/214 |
| | | | | 709/203 |
| 2015/0227535 | A1* | 8/2015 | Avati | G06F 16/116 |
| | | | | 707/741 |
| 2019/0026301 | A1* | 1/2019 | Wang | G06F 16/152 |
| 2022/0066989 | A1* | 3/2022 | Sonin | G06F 16/90335 |

* cited by examiner

Primary Examiner — Shyue Jiunn Hwa
(74) Attorney, Agent, or Firm — Reches Patents

(57) ABSTRACT

A method for updating file system entity (FSE) metadata. The method may include receiving, by a first computing entity, a request to perform a case-sensitive FSE operation that comprises one of (a) adding a case-sensitive version of a name of a FSE to a data structure, or (b) deleting the case-sensitive version of the name of the FSE from the data structure, the data structure comprises multiple name blocks; finding, by the first computing entity, a certain name block of the multiple name blocks that is associated with the case-sensitive version of the name of the FSE. The method may also include determining, by the first computing entity, whether (a) the certain name block is associated with a case-insensitive version of the name of the FSE, and whether (b) the first computing entity preceded a second computing entity in reaching the certain name block, the second computing entity was requested to perform a case-insensitive FSE operation that corresponds to the case-sensitive FSE operation; when it is found that (a) the certain name block is associated with the case-insensitive version of the name of the FSE, and (b) the first computing entity preceded the second computing entity in reaching the certain name block, then: a) informing the second computing entity that the first computing entity takes over a performing of the corresponding case-insensitive FSE operation; and b) performing the corresponding case-insensitive FSE operation by the first computing entity.

20 Claims, 8 Drawing Sheets

383

384

HANDLING CASE SENSITIVITY OF FILENAMES

BACKGROUND

Case sensitivity defines the way uppercase letters and lowercase letters are treated.

When treated as case-sensitive, the uppercase and lowercase letters are considered as composing distinct names, and when treated as case-insensitive, the uppercase and lowercase letters are considered as composing equivalent names.

A storage system may be required to support different file protocols that treat case sensitivity in different manners. Some file protocols, such as Unix based protocols (e.g., NFS—Network File System) may handle file and directory names as case sensitive, while other file protocols, such as Windows based protocols (e.g., SMB—Server Message Block) may handle names as case insensitive.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE DRAWINGS

The storage system described herein provides the server side of a multiprotocol filesystem, where the multiprotocol filesystem can be accessed by users using both case-sensitive file protocols and case-insensitive file protocols.

When a filesystem entity (FSE, e.g., a file or directory) is accessed by a client that uses a case-sensitive file protocol, there is a need to look up the filename using the exact letter case used by the user request. When a filesystem entity is accessed by a client that uses a case-insensitive file protocol, there is a need to look up the filename regardless of the specific letter case indicated by the user request.

Therefore, if no FSE is found with a name having the specific letter case indicated in the access request (case preserving approach) when looking up the filename using the letter case indicated in the request, a second look up will be performed, using a case insensitive version of the filename.

The term filename used herein is an example of a FSE name, which may be a name of a directory, file, or of any other FSE.

The case insensitive version of the filename includes a predetermined letter case, e.g., all lower-case letters or all upper-case letters, or any pre-determined combination of lower and upper case letters.

In order to allow case-insensitive as well as case-sensitive searches of names, when a new FSE is created, the original (case-sensitive) name, indicated in the request, is translated into a case insensitive name, and both case versions of the name are cataloged in a name data structure of the parent directory that hosts the new FSE.

Figure 1A:
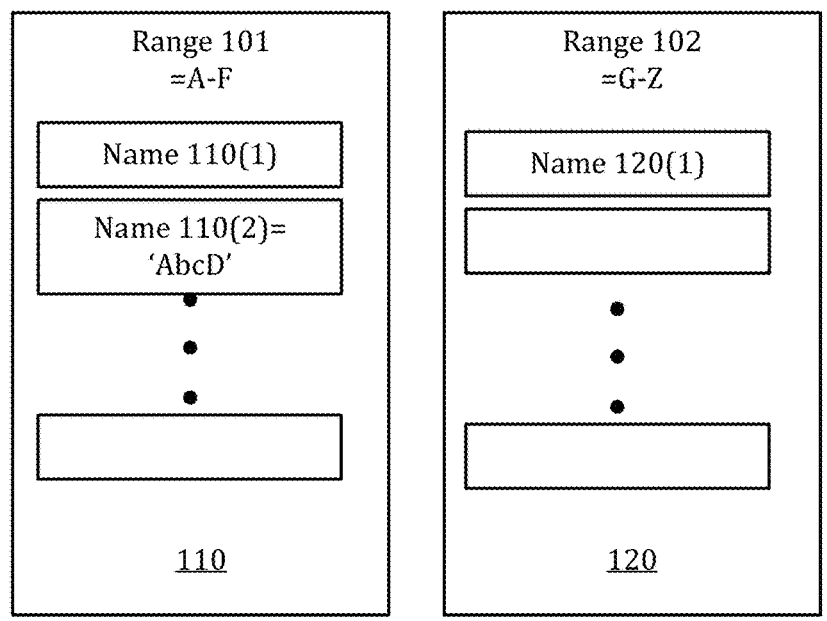
FIG. 1A is an example of multiple names blocks.
Figure 1A:
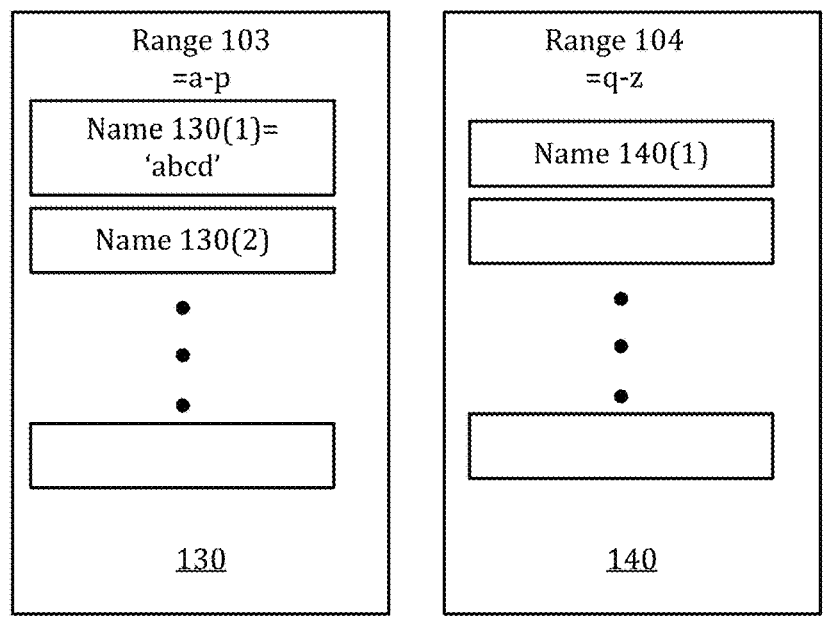

FIG. 1A illustrates multiple names blocks 110-140 included in a name data structure of the parent directory. The name blocks store names or presentations (shortened or compressed names, e.g., hash values) of the names of FSEs included in the directory, for example name 110(1), 110(2), 120(1), 130(1), 130(2) and 140(1). The names in the blocks are ordered according to a lexicographic order of the names, or more precisely, according to a character encoding order (such as Unicode standard) of the codes that correspond to the names. For example, block 110 stores all the names within the range 101, i.e., all the names within the range A to F, block 120 stores all the names within the range 102, i.e., all the names within the range G to Z, block 130 stores all the names within the range 103, i.e., all the names within the range a to p, and block 140 stores all the names within the range 104, i.e., all the names within the range q to z.

A FSE name "AbcD" which is the original (case-sensitive) name provided by a FSE creation or rename request is cataloged as name 110(2) in name block 110. The case insensitive version of the same name, "abcd" is cataloged as name 130(1) in name block 130.

Figure 1B:
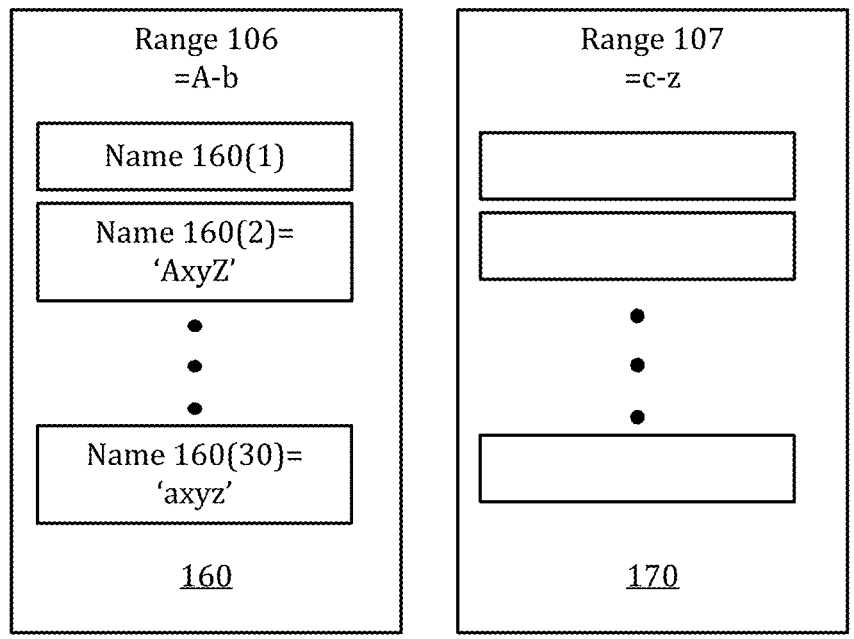
FIG. 1B is an example of multiple names blocks.

FIG. 1B illustrates name blocks of a smaller directory that includes only 2 name blocks: a name block 160 that stores names in the range 106 for names within the range A to b, and a block 170 that stores names in the range 107 for names within the range c to z. Unlike the example of FIG. 1A, where the case sensitive and case insensitive versions of the same FSE are stored in different name blocks, FIG. 1B illustrates that both the case sensitive version, e.g., name 160(2)="AxyZ", and the case insensitive version, e.g., name 160(30)="axyz" are located in the same name block 160.

The two case versions of a name may be stored in the same name block when the directory is relatively small in term of the number of FSEs included in the directory, or when the number of FSEs having names that fall between the two case versions of the FSE is smaller than the maximum number of names that can be stored in the name block, or when the case insensitive name does not fall outside the range covered by the name block.

An operation related to a name change in a directory, e.g., adding or deleting a name in a directory, includes two sub-operations for: handling (adding/deleting) a case sensitive name and a case insensitive name, e.g., adding both "AbcD" and "abcd" to a directory, or -deleting both from the directory. Each sub-operation includes: traversing the directory data structure from the root to a name block that includes the name (the case sensitive or insensitive version of the name), and then—perform the addition or deletion.

Doubling the name change operation into two operations affects the latency experienced by operations related to creating or deleting FSE names.

Therefore, each sub-operation is assigned to a different computing entity, where the two computing entities are executed in parallel—one computing entity performs the case sensitive sub-operation and the other performs the case insensitive sub-operation.

If the two case versions of the FSE name—are located in different name blocks (according to alphabetical order)—then the two sub-operations are executed in parallel without interference to each other.

However, if the two case versions of the name—are located in the same name block—the first computing entity (of the two) that founds the block, will lock the block for the purpose of mutual exclusion while updating the block. The locking will cause the second computing entity, that was assigned with the second case sub-operation to wait until the lock is freed. Therefore, the execution is performed in a serial manner, when both case versions of a name are stored in the same name block.

According to an embodiment of the invention, when a computing entity finds the name block and succeeds in locking it (meaning—it is the first in the race to locate the name block)—it checks whether the other case version of the name (that is supposed to be handled by the second computing entity)—belongs to the same name block. This may be done by checking the lowest name and the highest name that exists in, or belongs to the name block, or associated with the name block in any other manner that is dictated by the manner in which the name ranges are split among name blocks, e.g., by using a minimum and maximum values of the range of names that are indicated in the header of the block (e.g., range 106 of FIG. 1B). If the other case version of the name is within the range of the names of the name block—the first computing entity signals the second computing entity to abort, and performs both sub-operations, on behalf of the second computing entity.

Figure 2:
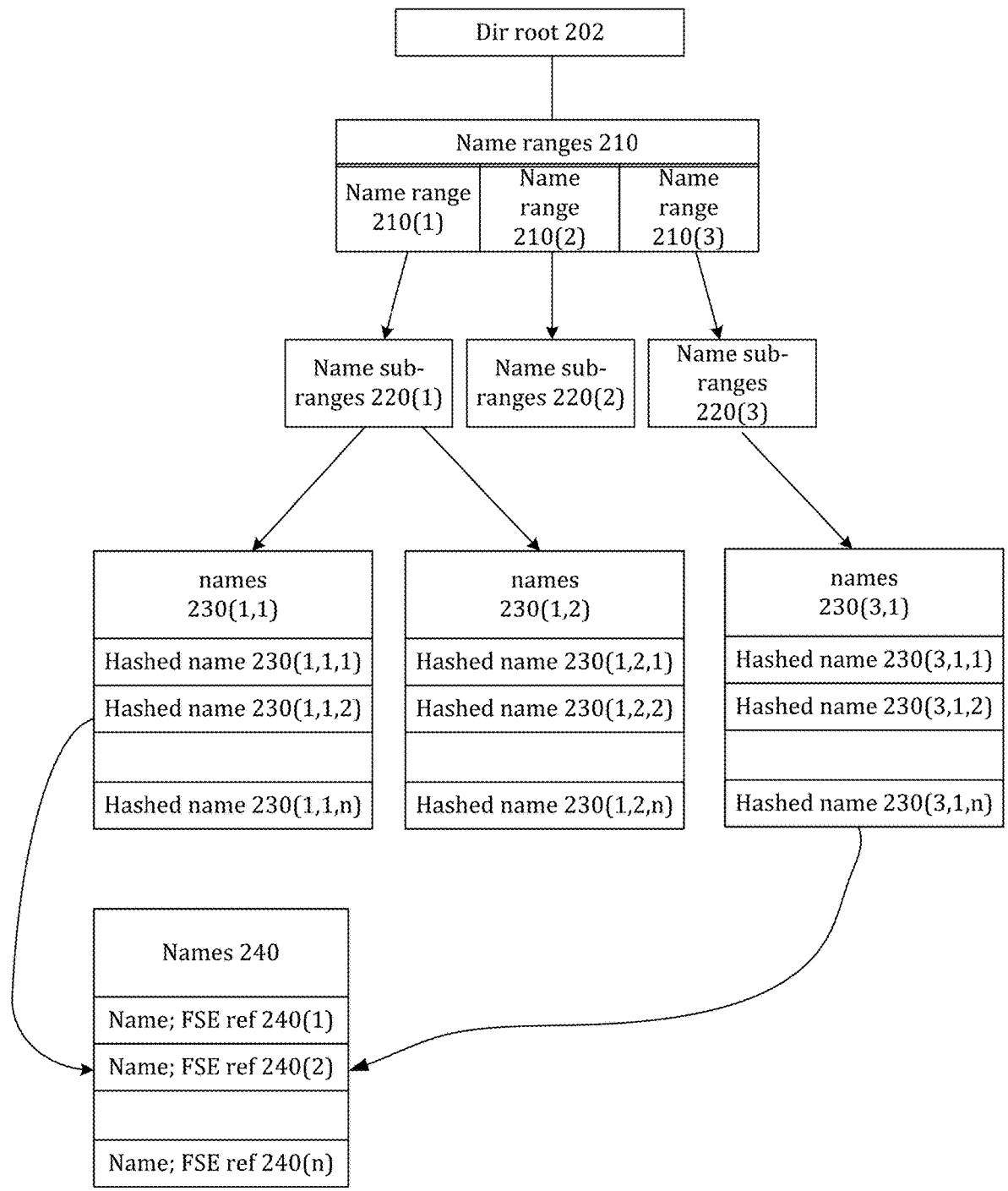
FIG. 2 is an example of a data structure.

FIG. 2 illustrates a directory metadata 200 in the form of a hierarchical data structure having multiple levels. The root level, directory root 202, includes directory characteristics, and points to name ranges 210, that includes entries 210(1)-210(3) for multiple name ranges, where each entry, includes the alphanumeric range that is pointed by the entry to a lower level in the tree. The name ranges are further split and may span over one or multiple intermediate levels of the tree (depending on the number of FSEs in the directory), such as the lower level, name-sub-ranges 220(1)-220(3), that may include pointers for each sub-range, either to another layer of sub-ranges, or to a name level 230.

FIG. 2 illustrates the tree node name-sub-ranges 220(1), as pointing to two name blocks 230(1,1) and 230(1,2), and tree node name-sub-ranges 220(3), as pointing to name block 230(3,1). Each of the name blocks 230 is associated with a different sub-range of names.

Instead of names, blocks 230 may include hashed values (or any other compressed presentation) of the names, to facilitate name comparison and to save storage space, since the layers above the lowest layer may be stored in a non-volatile memory (NVRAM), while the lowest layer may be stored in disks, such as SSDs.

Each entry in name blocks 230 further points to a name block 240 that may be stored in the SSD, such as names block 240. Block 240 includes the full names, which may be the original case version of the FSE, as indicated in the FSE creation or rename request.

Suppose the case sensitive version (or a hash value representation of the case sensitive version) of a name is stored in entry 230(1,1,2) of name block 230(1,1) and the case insensitive version of the same name is stored in entry 230(3,1,n) of name block 230(3,1)—then both are pointing to the same entry 240(2) of name block 240 that includes the full original name and a reference (pointer) to a metadata of the FSE.

When a new name needs to be added, or when a name needs to be deleted, a first computing entity is assigned with a sub-operation for adding/deleting the case sensitive name, and a second computing entity is assigned with a sub-operation for adding/deleting the case insensitive name. The first computing entity may need to traverse the tree via nodes 210(1), 220(1) and 230(1,1), where the case sensitive version should be added or deleted from, while the second computing entity may need to traverse the tree via nodes 210(3), 220(3) and 230(3,1), where the case insensitive version should be added or deleted from.

If on the other hand, both case versions are stored in the same name block, e.g., 230(1,1), then the computing entity that traverses the tree and is the first to locate block 230(1,1), locks the block, abort the other computing entity, and handles both case versions of the name.

Figure 3A:
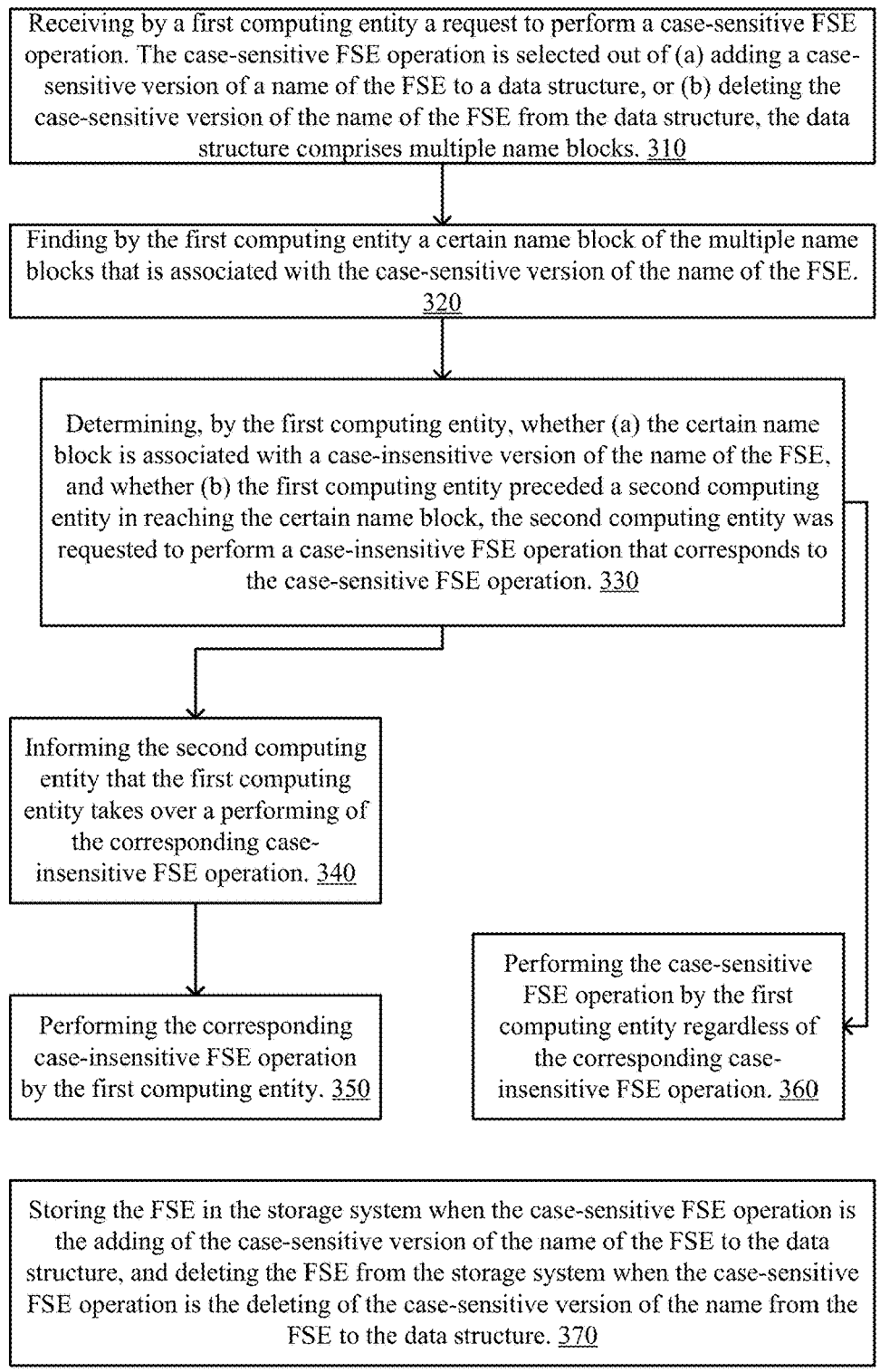
FIG. 3A is an example of a method.

FIG. 3A illustrates an example of method 300 for updating file system entity (FSE) metadata. The FSE metadata may be the metadata of a parent directory (e.g., data structure 200) that includes a FSE (file or sub-directory) whose name needs to be added or deleted from the parent directory.

According to an embodiment, method 300 includes step 310 of receiving by a first computing entity a request to perform a case-sensitive FSE operation. The case-sensitive FSE operation is selected out of (a) adding a case-sensitive version of a name of the FSE to a data structure, or (b) deleting the case-sensitive version of the name of the FSE from the data structure, the data structure comprises multiple name blocks.

According to an embodiment, step 310 is followed by step 320 of finding by the first computing entity a certain name block of the multiple name blocks that is associated with the case-sensitive version of the name of the FSE.

According to an embodiment step 320 is followed by step 330 of determining, by the first computing entity, whether (a) the certain name block is associated with a case-insensitive version of the name of the FSE (in addition to being associated with the case-sensitive version), and whether (b) the first computing entity preceded a second computing entity in reaching the certain name block, the second computing entity was requested to perform a case-insensitive FSE operation that corresponds to the case-sensitive FSE operation. The first and second computing entities may be requested to perform one of the FSE operations (case sensitive or insensitive) in parallel.

According to an embodiment, step 330 is executed while attempting to lock the certain name block by the first computing entity. If, for example the attempt succeeds then the first computing entity assumes that it preceded the second computing entity.

If, for example, the attempt fails, then the first computing entity assumes that it followed the second computing entity—although the first computing entity may wait to receive a notice from the second computing entity about taking over the handling of the operation by the second computing entity—to make sure than the lock did not fail for another reason than having the second computing entity lock the certain name block.

According to an embodiment, when it is found that both condition (a) and condition (b) are fulfilled (the certain name block is associated with the case-insensitive version of the name of the FSE, and the first computing entity preceded the second computing entity in reaching the certain name block) then step 330 is followed by steps 340 and 350.

According to an embodiment, step 340 includes informing the second computing entity that the first computing entity takes over a performing of the corresponding case-insensitive FSE operation. The second computing entity may be aborted in this case.

According to an embodiment, step 340 is followed by step 350 of performing the corresponding case-insensitive FSE operation by the first computing entity (in addition to performing the case-sensitive FSE operation that was originally assigned to the first computing entity). The corresponding case-insensitive FSE operation corresponds to the case-sensitive FSE operation, since both operations are for handling both versions of the same FSE name, in response to a need to handle the name, i.e., upon adding the FSE or deleting the FSE from its parent directory, or rename the FSE.

According to an embodiment, when it is found that at least one condition of conditions (a) and (b) is not fulfilled—step 340 is followed by step 360 of performing the case-sensitive FSE operation by the first computing entity regardless of the corresponding case-insensitive FSE operation. In this case, the corresponding case-insensitive FSE operation is probably directed to a different name block and is carried on by the second computing entity, in parallel.

According to an embodiment, step 330 includes scanning the data structure by the first computing entity.

According to an embodiment, the data structure includes multiple pointers that point to the multiple name blocks.

According to an embodiment, each name block of the multiple name blocks includes a names range metadata indicative of a range of FSE names stored in the name block. An example of the data structure is illustrated in FIG. 2, where the multiple name blocks that are part of the data structure are illustrated in FIGS. 1A and 1B.

According to an embodiment, method 300 further includes step 370 of (a) storing the FSE in the storage system when the case-sensitive FSE operation is the adding of the case-sensitive version of the name of the FSE to the data structure, and (b) deleting the FSE from the storage system when the case-sensitive FSE operation is the deleting of the case-sensitive version of the name from the FSE to the data structure.

Figure 3B:
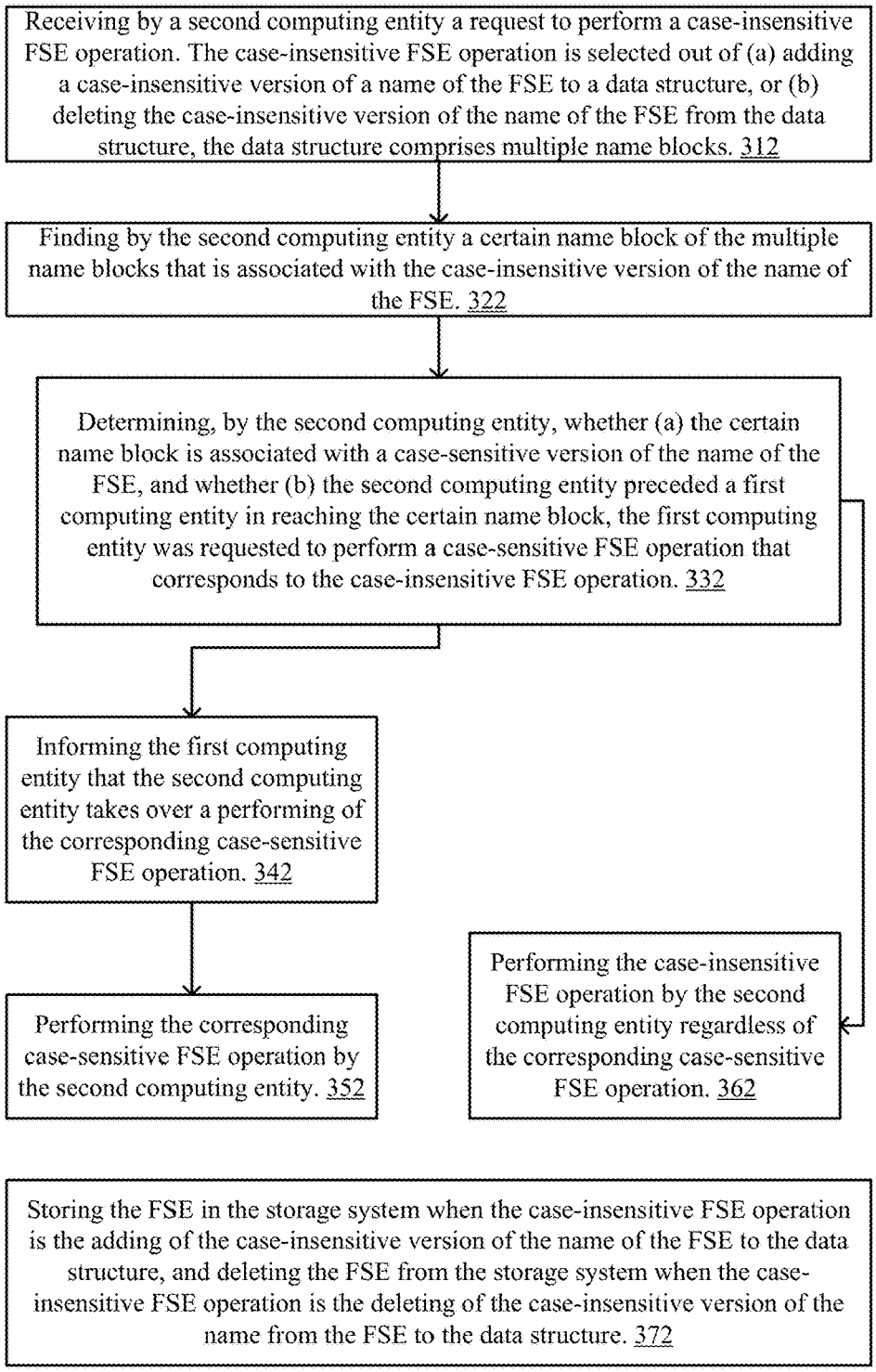
FIG. 3B is an example of a method.

FIG. 3B illustrates an example of method 302 for updating file system entity (FSE) metadata.

According to an embodiment, method 302 includes step 312 of receiving by a second computing entity a request to perform a case-insensitive FSE operation. The case-insensitive FSE operation is selected out of (a) adding a case-insensitive version of a name of the FSE to a data structure, or (b) deleting the case-insensitive version of the name of the FSE from the data structure, the data structure comprises multiple name blocks. The request to perform a case-insensitive FSE operation may include the case-sensitive version of the name of the FSE, and the second computing entity may need to translate the case-sensitive version into the case-insensitive version.

According to an embodiment, step 312 is followed by step 322 of finding by the second computing entity a certain name block of the multiple name blocks that is associated with the case-insensitive version of the name of the FSE. Step 322 may include translating the case-sensitive version of the FSE name into the case-insensitive version, and searching for the case-insensitive version of the name.

According to an embodiment step 322 is followed by step 332 of determining, by the second computing entity, whether (a) the certain name block is associated with a case-sensitive version of the name of the FSE, and whether (b) the second computing entity preceded a first computing entity in reaching the certain name block, the first computing entity was requested to perform a case-sensitive FSE operation that corresponds to the case-insensitive FSE operation.

According to an embodiment, when it is found that both condition (a) and condition (b) are fulfilled (the certain name block is associated with the case-sensitive version of the name of the FSE, and the second computing entity preceded the first computing entity in reaching the certain name block) then step 332 is followed by steps 342 and 352.

According to an embodiment, step 342 includes informing the first computing entity that the second computing entity takes over a performing of the corresponding case-sensitive FSE operation.

According to an embodiment, step 342 is followed by step 352 of performing the corresponding case-sensitive FSE operation by the second computing entity.

According to an embodiment, method 302 further includes step 372 of (a) storing the FSE in the storage system when the case-insensitive FSE operation is the adding of the case-insensitive version of the name of the FSE to the data structure, and (b) deleting the FSE from the storage system when the case-insensitive FSE operation is the deleting of the case-insensitive version of the name from the FSE to the data structure.

According to an embodiment, method 300 and 302 are executed in at least a partially overlapping manner, e.g., parallel execution by the two computing entities.

Figure 4A:
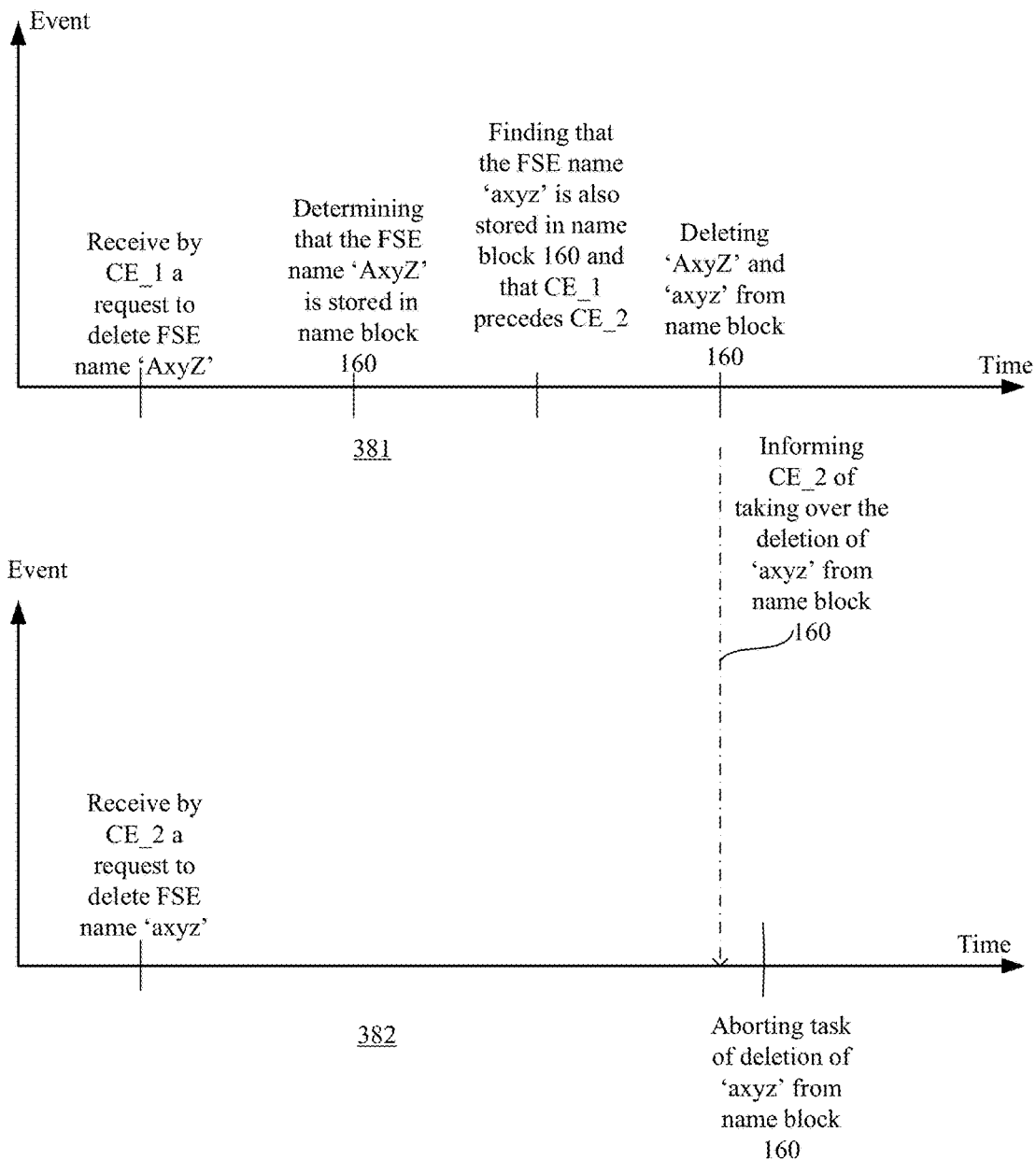
FIG. 4A is an example of a timing diagram.

FIG. 4A illustrates an example of timing diagrams 381 and 382 that span along the same or partially overlapping time period.

Timing diagram 381 illustrates the sequence of steps executed by the first computing entity (CE_1):
 a. Receive by CE_1 a request to delete FSE name 'AxyZ'.
 b. Determining that the FSE name 'AxyZ' is stored in name block 160
 c. Finding that the FSE name 'axyz' is also stored in name block 160 and that CE_1 precedes the second computing entity (CE_2).
 d. Deleting 'AxyZ' and 'axyz' from name block 160.
 e. Informing CE_2 of taking over the deletion of 'axyz' from name block 160

Timing diagram 382 illustrates the sequence of steps executed by the second computing entity (CE_2):
 a. Receiving by CE_2 a request to delete FSE name 'axyz'
 b. Receiving the message from CE_1 about CE_1 taking over the deletion of 'axyz' from name block 160.
 c. Aborting the task of deletion of 'axyz' from name block 160.

Figure 4B:
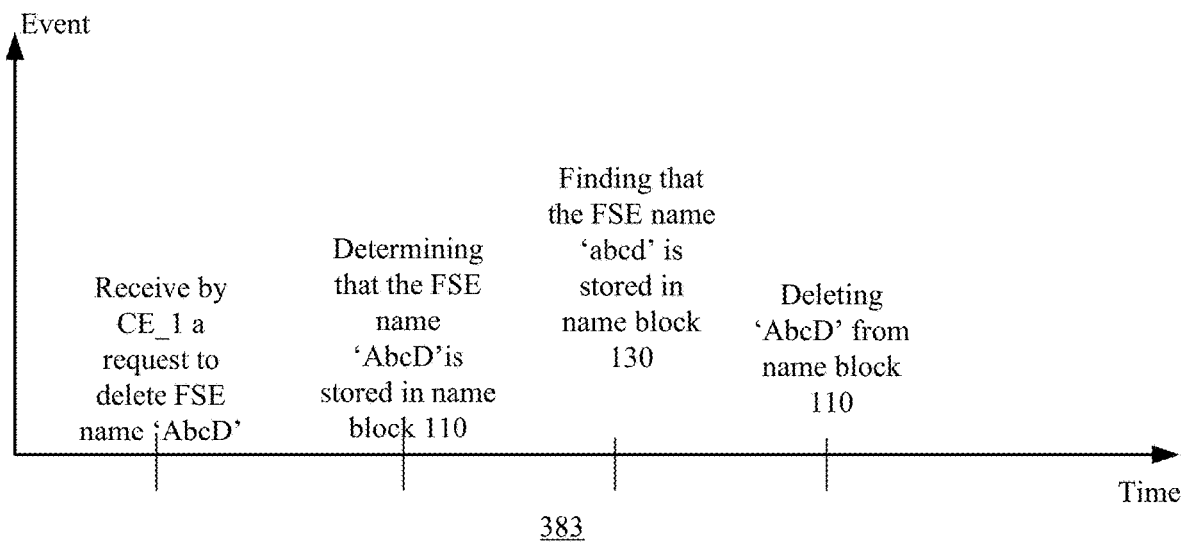
FIG. 4B is an example of a timing diagram.

FIG. 4B illustrates an example of timing diagrams 383 and 384 that span along the same time period.

While FIG. 4A illustrates a case where both case versions of the FSE name resides in the same name block, FIG. 4B illustrates a case where the two case versions resides in different name blocks, and both computing entities are executed in parallel without interaction between them.

Timing diagram 383 illustrates the sequence of steps executed by the first computing entity (CE_1):
 a. Receive by CE_1 a request to delete FCE name 'AbcD'.
 b. Determining that the FSE name 'AbcD' is stored in name block 110
 c. Finding that the FSE name 'abcd' is not stored in name block 110.
 d. Deleting 'AbcD' from name block 110.

Timing diagram 382 illustrates the sequence of steps executed by the second computing entity (CE_2):
 a. Receive by CE_2 a request to delete FSE name 'abcd'.
 b. Determining that the FSE name 'abcd' is stored in name block 130
 c. Finding that the FSE name 'AbcD' is not stored in name block 130.
 d. Deleting 'abcd' from name block 130.

Figure 5:
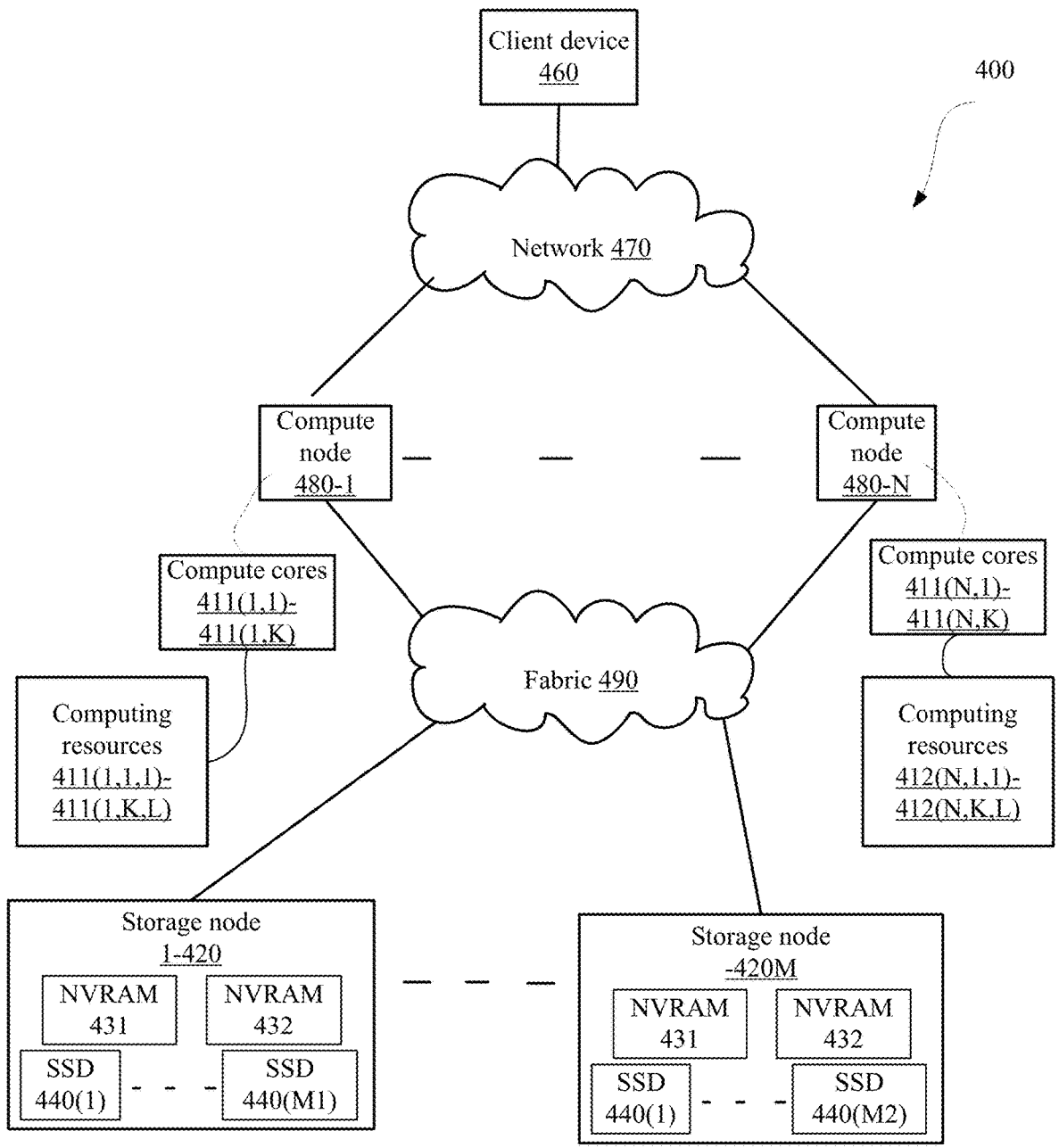
FIG. 5 is an example of a storage system.

FIG. 5 shows an example diagram of a storage system 400 according to the disclosed embodiments.

The storage system 400 includes a number of N compute nodes 480-1 through 480-N (hereinafter referred to individually as a compute node 480 and collectively as compute nodes 480, merely for simplicity purposes, N is an integer equal to or greater than 1).

Each of the compute nodes includes multiple compute cores—see for example compute cores 411(1,1)-411(1,K) and compute cores 411(N,1)-411(N,K). A compute core can be a processing circuitry, a part of processing circuitry, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits. The compute entities may be the compute nodes or the compute cores.

A computing entity may be a compute node, may be a compute core or may be a computing resource that is included within a compute core—see for example, computing resources 412(N,1,1)-412(N,K,L) of compute cores 412(1,N)-412(N,K) and computing resources 411(1,1,1)-411(1,K,L) of compute cores 411(1,N)-411(1,K). According to an embodiment, a computing entity is a hardware component such as an arithmetic logic unit, a computing circuit that is capable of executing a thread, and the like.

The storage system 400 also includes a number of M storage nodes 420-1 through 420-M (hereinafter referred to individually as a storage node 420 and collectively as storage nodes 420, merely for simplicity purposes, M is an integer equal to or greater than 1). The compute nodes 480 and the storage nodes 420 are connected through a communication fabric 490. M may equal N or may differ from N.

Each compute node 480 interfaces with multiple client devices such as a client device 460 (or an application installed therein) via a network 470. To this end, a compute node 480 is configured to receive requests (e.g., read or write requests) and promptly serve these requests in a persistent manner. The network 470 may be, but is not limited to, the Internet, the world-wide-web (WWW), a local area network (LAN), a wide area network (WAN), and the like.

In an embodiment, a compute node 480 is configured to interface with different protocols implemented by the client devices or applications (e.g., TCP/IP, HTTP, FTP, various filesystem protocols, etc.) and to manage the read and write operations to the storage nodes 420.

According to an embodiment, the compute nodes are configured to perform one or more steps of method 300 and/or method 302.

Figure 4B:
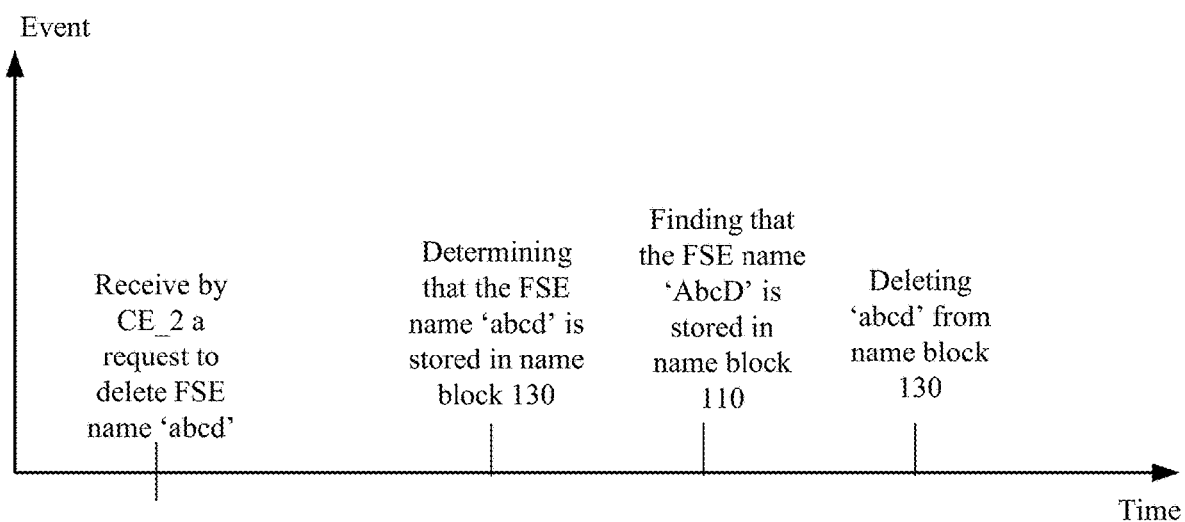

The storage nodes 420 provide the storage and state in the system 400. Each storage node 420 may include a plurality of SSDs, such as SSDs 440, for example storage node 420-1 includes M1 SSDs 440(1)-340(M1). Each storage node further includes fast accessed memory for storing segments of the lock data structure, such as NVRAM 431 and 432 of FIG. 4. Data structure 200 may be stored in one or more of the storage nodes, where parts of the data structure 200, mainly the upper layers, may be stored in the NVRAM, while other parts, e.g., the lowest level may be stored in the SSDs.

The storage nodes 420 may be configured to have the same capacity as each other or different capacities from each other. In an embodiment, the data stored in each storage node 420 is made redundant internally within the storage node, made redundant at a different storage node, or both.

A storage node 420 may be configured to communicate with the compute nodes 480 over the communication fabric 490. It should be noted that each compute node 480 can communicate with each storage node 420 over the communication fabric 490. There may not be a direct coupling between a compute node 480 and storage node 420.

In the embodiment, the communication fabric 490 may include an Ethernet fabric, an InfiniBand fabric, and the like. Specifically, the communication fabric 490 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for updating file system entity (FSE) metadata, the method comprising:
receiving a request to perform a FSE operation, and identifying that the FSE operation requires performing both a case-sensitive FSE operation and a case-insensitive FSE operation;
assigning a request to perform the case-sensitive FSE operation to a first computing entity, and assigning a request to perform the case-insensitive FSE operation to a second computing entity;
performing, by the first computing entity, the case-sensitive FSE operation that comprises one of (a) adding a case-sensitive version of a name of a FSE to a data structure, or (b) deleting the case-sensitive version of the name of the FSE from the data structure, the data structure comprises multiple name blocks;
finding, by the first computing entity, a certain name block of the multiple name blocks, wherein the certain name block is associated with the case-sensitive version of the name of the FSE;
determining, by the first computing entity, whether (a) the certain name block is associated with a case-insensitive version of the name of the FSE, and whether (b) the first computing entity preceded the second computing entity in reaching the certain name block,
when determining that (a) the certain name block is associated with the case-insensitive version of the name of the FSE, and (b) the first computing entity preceded the second computing entity in reaching the certain name block, then:
informing the second computing entity that the first computing entity takes over a performing of the case-insensitive FSE operation; and
performing the case-insensitive FSE operation, in addition to the performing of the case-sensitive FSE operation, by the first computing entity.

2. The method according to claim 1, wherein the determining is executed while attempting to lock the certain name block by the first computing entity.

3. The method according to claim 1, wherein when determining that the certain name block is not associated with the case-insensitive version of the name of the FSE, then performing the case-sensitive FSE operation by the first computing entity regardless of the corresponding case-insensitive FSE operation.

4. The method according to claim 1, wherein the finding by the first computing entity of the certain name block comprises scanning the data structure.

5. The method according to claim 1, wherein the data structure comprises multiple pointers that point to the multiple name blocks.

6. The method according to claim 1, wherein each name block of the multiple name blocks comprises a names range metadata indicative of a range of FSE names stored in the name block.

7. The method according to claim 1, comprising:
determining, by the second computing entity, whether (i) the certain name block is associated with the case-sensitive version of the name of the FSE, and whether (ii) the second computing entity preceded the first computing entity in reaching the certain name block;
when determining that (i) the certain name block is associated with the case-sensitive version of the name of the FSE, and (ii) the second computing entity preceded the first computing entity in reaching the certain name block, then:
informing the first computing entity that the second computing entity takes over a performing of the case-sensitive FSE operation; and
performing both the case-insensitive FSE operation and the case-sensitive FSE operation by the second computing entity.

8. The method according to claim 1, wherein the case-sensitive FSE operation is the adding of the case-sensitive version of the name of the FSE to the data structure, and wherein the method further comprises storing the FSE in the storage system.

9. The method according to claim 1, wherein the case-sensitive FSE operation is the deleting of the case-sensitive version of the name of the FSE from the data structure, and wherein the method further comprises deleting the FSE from the storage system.

10. A non-transitory computer readable medium for updating file system entity (FSE) metadata, the non-transitory computer readable medium stores instructions for:
receiving a request to perform a FSE operation, and identifying that the FSE operation requires performing both a case-sensitive FSE operation and a case-insensitive FSE operation;
assigning a request to perform the case-sensitive FSE operation to a first computing entity, and assigning a request to perform the case-insensitive FSE operation to a second computing entity;
performing, by the first computing entity, the case-sensitive FSE operation that comprises one of (a) adding a case-sensitive version of a name of a FSE to a data structure, or (b) deleting the case-sensitive version of the name of the FSE from the data structure, the data structure comprises multiple name blocks;
finding, by the first computing entity, a certain name block of the multiple name blocks, wherein the certain name block is associated with the case-sensitive version of the name of the FSE;
determining, by the first computing entity, whether (a) the certain name block is associated with a case-insensitive version of the name of the FSE, and whether (b) the first computing entity preceded the second computing entity in reaching the certain name block;
when determining that (a) the certain name block is associated with the case-insensitive version of the name of the FSE, and (b) the first computing entity preceded the second computing entity in reaching the certain name block, then:
informing the second computing entity that the first computing entity takes over a performing of the case-insensitive FSE operation; and
performing the case-insensitive FSE operation in addition to the performing of the case-sensitive FSE operation, by the first computing entity.

11. The non-transitory computer readable medium according to claim 10, wherein the determining is executed while attempting to lock the certain name block by the first computing entity.

12. The non-transitory computer readable medium according to claim 10, wherein when determining that the certain name block is not associated with the case-insensitive version of the name of the FSE, then performing the case-sensitive FSE operation by the first computing entity regardless of the corresponding case-insensitive FSE operation.

13. The non-transitory computer readable medium according to claim 10, wherein the finding by the first computing entity of the certain name block comprises scanning the data structure.

14. The non-transitory computer readable medium according to claim 10, wherein the data structure comprises multiple pointers that point to the multiple name blocks.

15. The non-transitory computer readable medium according to claim 10, wherein each name block of the multiple name blocks comprises a names range metadata indicative of a range of FSE names stored in the name block.

16. The non-transitory computer readable medium according to claim 10, that stores instructions for:
determining, by the second computing entity, whether (i) the certain name block is associated with the case-insensitive version of the name of the FSE, and whether (ii) the second computing entity preceded the first computing entity in reaching the certain name block;
when determining that (i) the certain name block is associated with the case-insensitive version of the name of the FSE, and (ii) the second computing entity preceded the first computing entity in reaching the certain name block, then:
informing the first computing entity that the second computing entity takes over a performing of the case-sensitive FSE operation; and
performing both the case-insensitive FSE operation and the case-insensitive FSE operation by the second computing entity.

17. The non-transitory computer readable medium according to claim 10, wherein the case-sensitive FSE operation is the adding of the case-sensitive version of the name of the FSE to the data structure, and wherein the non-transitory computer readable medium further stores instructions for storing the FSE in the storage system.

18. The non-transitory computer readable medium according to claim 10, wherein the case-sensitive FSE operation is the deleting of the case-sensitive version of the name of the FSE from the data structure, and wherein the non-transitory computer readable medium further stores instructions for deleting the FSE from the storage system.

19. A storage system, comprising:
a first computing entity;
a second computing entity;
a storage unit, configured to store a data structure that comprises multiple name blocks;
a compute node;
wherein the compute node is configured to:
receive a request to perform a FSE operation, and identify that the FSE operation requires performing both a case-sensitive FSE operation and a case-insensitive FSE operation;
send to the first computing entity a request to perform the case-sensitive FSE operation that comprises one of (a) adding a case-sensitive version of a name of the FSE to a data structure, or (b) deleting the case-sensitive version of the name of the FSE from the data structure, the data structure comprises multiple name blocks;

send to the second computing entity a request to perform the case-insensitive FSE operation that comprises one of (a) adding a case-insensitive version of a name of the FSE to a data structure, or (b) deleting the case-insensitive version of the name of the FSE from the data structure;

wherein the first computing entity is configured to:
  (i) find a certain name block of the multiple name blocks, wherein the certain name block is associated with the case-sensitive version of the name of the FSE;
  (ii) determine whether (a) the certain name block is associated with a case-insensitive version of the name of the FSE, and whether (b) the first computing entity preceded the second computing entity in reaching the certain name block;
  (iii) when determining, by the first computing entity, that (a) the certain name block is associated with the case-insensitive version of the name of the FSE, and (b) the first computing entity preceded the second computing entity in reaching the certain name block, then:
    a. inform the second computing entity that the first computing entity takes over a performing of the case-insensitive FSE operation; and
    b. perform both the case-sensitive FSE operation and the case-insensitive FSE operation by the first computing entity.

20. The storage system according to claim 19, wherein the first computing entity is configured to perform the case-sensitive FSE operation by the first computing entity regardless of the case-insensitive FSE operation when determining that the certain name block is not associated with the case-insensitive version of the name of the FSE.

* * * * *